United States Patent

[11] 3,618,664

| [72] | Inventor | Robert R. Harvey<br>Bartlesville, Okla. |
|---|---|---|
| [21] | Appl. No. | 825,403 |
| [22] | Filed | May 16, 1969 |
| [45] | Patented | Nov. 9, 1971 |
| [73] | Assignee | Phillips Petroleum Company |

[54] OIL RECOVERY METHOD USING AN AQUEOUS FLUID DRIVE
10 Claims, No Drawings

[52] U.S. Cl..................................................... 166/274,
252/8.55 D
[51] Int. Cl..................................................... E21b 43/22
[50] Field of Search............................................ 166/274,
275, 273, 268, 246; 252/8.55 D

[56] References Cited
UNITED STATES PATENTS

| 3,208,518 | 9/1965 | Patton | 166/275 X |
| 3,373,808 | 3/1968 | Patton | 166/275 |
| 3,305,016 | 2/1967 | Lindblom et al. | 166/246 |
| 3,407,877 | 10/1968 | Harvey et al. | 166/274 |
| 3,412,792 | 11/1968 | Parker et al. | 166/274 |
| 3,434,542 | 3/1969 | Dotson et al. | 166/273 |
| 3,476,187 | 11/1969 | Harvey | 166/274 |

*Primary Examiner*—Stephen J. Novosad
*Attorney*—Young and Quigg

ABSTRACT: Oil is produced by fluid drive using a slug in advance of the drive which contains a suspension of minute solids such as carbon black and at least one polyethylene oxide-type surfactant plus a polysaccharide-type viscosifier.

3,618,664

OIL RECOVERY METHOD USING AN AQUEOUS FLUID DRIVE

BACKGROUND OF THE INVENTION

The present invention relates to methods for the recovery of petroleum from natural reservoirs, and, more particularly, relates to an improved process for reinstituting or increasing the production of oil from subterranean reservoirs partially depleted by primary recovery techniques. In another aspect, this invention relates to an improved process for producing oil from an oil stratum by aqueous fluid drive utilizing oil-displacing agents including surfactants, viscosifiers and minute solids.

Recognition that techniques utilized in the initial exploitation of subterranean oil-bearing reservoirs generally permit the recovery of only a small fraction of the total oil originally present in such reservoirs has led to the development of a number of secondary recovery processes designed to stimulate production after the natural energy of the reservoir has been expended. The most widely used of these is the waterflooding process. By simply injecting water into an underground reservoir through one or more injection wells under sufficient pressure to force it in the direction of one or more production wells spaced some distance from the injection wells, much of the oil left in the reservoir after the well has ceased to flow at an economical rate can be recovered. The waterflooding process is considerably more attractive than many other secondary recovery processes of the displacement type because the water utilized can be obtained ordinarily at little cost and need not be recovered from the reservoir in order to make the process economically feasible.

Despite the obvious advantages of waterflooding as secondary recovery technique, it has often suffered by comparison with other processes. Field evaluations have shown that waterflooding permits the recovery of much oil that cannot be produced by primary recovery techniques, but that considerable quantities of the oil will nevertheless remain in the reservoir following a waterflooding operation. The principal reason for this appears to be the tendency of the injected water to finger through the sections of the reservoir offering the least resistance and to bypass much of the oil present in the reservoir. In addition, it has been demonstrated that capillary and surface forces prevent the displacement of appreciable quantities of oil present in those sections of the reservoir through which the water actually passes.

The production of oil by aqueous fluid drive utilizing surfactants in the aqueous fluid is a proposed process for field operation. In such a process, the amount of surfactant which must be used usually exceeds the concentration needed to be effective by several orders of magnitude. The reason lies in the fact that certain strata, such as zeolites, attract the surfactant from the aqueous carrier rather rapidly. This builds up the concentration of surfactant in the immediate vicinity of the injection well, leaving the carrier liquid substantially stripped and incapable of treating the deeper parts of the stratum.

It has been found that certain minute solids such as carbon black, kaolin, and talc, as disclosed in U.S. Pat. No. 3,326,287, when added to an aqueous driving fluid containing dissolved surfactants having oil-displacing properties, function as carriers for the displacing surfactants and more effectively transport the surfactant deeper into the stratum to more effectively displace oil. Other solids which have been found to function similarly are dead micro-organisms including bacteria and yeast cells as disclosed in U.S. Pat. No. 3,312,279.

While the processes of these applications provide a greater penetration and dispersion of the surfactant than in processes utilizing the surfactant alone, it has been found that such suspensions, and particularly those made with carbon black, tend to settle out quickly or the particles tend to agglomerate if the suspension are allowed to stand for any length of time. There is a tendency to plug, especially in even slightly brackish water.

More recently it has been found that certain combinations of polyethylene oxide-type surfactants in combination with the above-mentioned minute solids tend to alleviate the problems of solids settling out or agglomerating, even in brackish water. Even though this system represented a tremendous improvement in the prior art, this system does not yield complete recovery of the oil found in subterranean oil-bearing reservoirs.

Investigations into the mechanisms by which one fluid displaces another within a porous medium have demonstrated that the relative viscosities of the two fluids play an important role in determining the efficiency of the displacement. It can be shown that the displacement efficiency is directly related to the ratio of viscosity of the displacing fluid to that of the displaced fluid. In view of this effect of viscosity ratio upon displacement efficiency, it has been suggested that a more viscous liquid than water be employed as a displacing agent during secondary recovery operations. However, economic considerations dictate that the liquid so used be an aqueous solution. A variety of polymeric materials and other thickening agents have been advocated as useful for preparing such solutions.

Recently it has been disclosed in U.S. Pat. No. 3,305,016 that certain heteropolysaccharides formed by the bacterial fermentation of simple carbohydrates possesses properties which render them suitable for use as thickeners in connection with secondary recovery operations. Solutions of these heteropolymers have no perceptible plugging tendencies, are exceptionally stable at temperatures above those likely to be encountered in the deepest oil-bearing reservoirs, and are not absorbed by rock surfaces or degraded upon contact with such surfaces. However, for the most part, these materials are relatively expensive and must be used in concentrations which make their cost prohibitive.

Accordingly, an object of this invention is to provide an improved aqueous fluid drive process for recovering oil from an oil-bearing stratum.

Another object is to improve the economics of waterflooding operations in which viscosifiers are incorporated in the injected water.

Another object is to provide a better suspension of minute solid carriers for injection in an aqueous fluid drive process.

A further object is to improve the utility and efficiency of the surfactants in aqueous fluid drive processes utilizing surfactants in solution therein. Other objects of the invention will become apparent to one skilled in the art upon consideration of the accompanying disclosure.

SUMMARY OF THE INVENTION

The invention comprises injecting into a well in an oil stratum from 0.05 to 1 pore volume of an aqueous slug comprising (a) a suspension of minute solids of a size in the range of 0.001 to 1 micron capable of being driven through said stratum by aqueous fluid drive to assist in displacing oil therefrom, (b) at least one polyethylene oxide-type surfactant in solution in a concentration in the range of 0.001 to 2 weight percent, and (c) a microbial gum polysaccharide in solution in a concentration in the range of about 0.01 to about 0.5 weight percent.

In one embodiment of the invention, the aqueous slug contains two different polyethylene oxide-type surfactants wherein one of the surfactants has the formula R—R'—R"—H, as defined hereinafter, and the second surfactant has the formula R—O—R'—H, as defined hereinafter.

In a presently preferred embodiment, the two polyethylene oxide-type surfactants are employed in equal amounts.

In a preferred embodiment, it has now been surprisingly found that the efficiency of displacing oil from a subterranean formation utilizing an aqueous fluid drive can be greatly improved by employing an aqueous fluid drive comprising (a) a suspension of minute solids of a size in the range of 0.01 to 1 micron capable of being driven through such stratum or aqueous fluid drive to assist in displacing oil therefrom, (b) an oil-displacing surfactant having the formula R—R'—R"—H wherein R is an aliphatic alkyl of 0 to 20 carbon atoms or an alkylaryl of which the alkyl has 8 to 20 carbon atoms and the aryl is attached to R', R' is O (oxygen) or S (sulfur), and R'' is polyethylene oxide of an average of four to 11 units, in solution in a concentration in the range of about 0.1 to about 1 weight percent, (c) a dispersing surfactant having the formula R—O—R'—H wherein R is an aliphatic alkyl of five to 20 carbon atoms or an alkylaryl, the alkyl having eight to 20 carbon atoms and the aryl is attached to the O, and the R' is polyethylene oxide with an average of 30 to 100 units, in solution in a concentration in the range of about 0.1 to about 1 weight percent, and (d) a viscosifier selected from heteropolysaccharides formed by the bacterial fermentation of simple carbohydrates in solution in a concentration in the range of about 0.1 to about 0.5 weight percent, and thereafter injecting aqueous driving medium through a well into the stratum so as to drive the suspension and surfactant solution through the stratum toward at least one offset well therein, and displace oil into said offset well and recovering displaced oil from the said offset well.

DESCRIPTION OF THE PREFERRED EMBODIMENTS

This invention is based in part upon the discovery that the addition of certain surfactants to an aqueous suspension of solid surfactant-carrying material in minute form containing an oil-displacing surfactant greatly improves the suspension and provides an improvement in displacing oil even though said certain surfactants have little or no oil displacing capacity per se. Of the many surfactants commercially available, only relatively few have been found to be effective in displacing oil from an oil stratum. U.S. Pat. No. 3,362,474 discloses the relatively few surfactants found to be effective oil displacers.

These surfactants are nonionic surfactants having the formula R—R'—R''—H wherein R is an aliphatic alkyl of nine to 20 carbon atoms having zero to four methyl branches or an alkylaryl in which the alkyl has from eight to 20, preferably eight to 12, carbon atoms and the aryl is attached to the R', R' is O (oxygen) or S (sulfur), and R'' is a polyethylene oxide of an average of four to 11, preferably 4.5 to 6.5 units. They belong to the families of polyoxyethylene or polyphenoxyethylene ethers and thioethers. The polyoxyethylene species are exemplified by tall oil ethylene oxide, lauryl alcohol ethylene oxide, and polyoxyethylene thioethers, having an average chain length on the hydrophilic end in the required range of four to 11, preferably 4.5 to 6.5. Typical of the polyphenoxyethylene species is Igepal CO-530 supplied by Antara Chemical Company and further identified as nonylphenoxy polyethanol having an average chain length on the hydrophilic end of about 6 to 6.5 moles or units of ethylene oxide. The oil-displacing surfactants have the capacity to change the condition of the oil sand from oil-wet to water-wet.

Certain surfactants have been found which do not in themselves have any oil-displacing capacity when utilized in an aqueous fluid drive but have synergistic effect in combination with the oil-displacing surfactants in an aqueous solution containing a suspension of the carrier solids. These surfactants have greater dispersing capacity than the oil-displacing surfactants and are nonionic surfactants having the formula R—O—R'—H wherein R is an aliphatic alkyl of five to 20 carbon atoms or an alkylaryl, the alkyl having eight to 20 carbon atoms and the aryl is attached to the 0, and R' is polyethylene oxide of an average of 80 to 100 units or mols. Typical of this class of surfactants are Igepal CO-990, and Igepal DM-970, trade names of Antara. Igepal CO-990 is nonylphenoxy polyethanol having an average chain length on the hydrophilic end in the range of 95–100 mols or units of ethylene oxide. The minimum number units of ethylene oxide in the hydrophilic chain is 30, surfactants with a lesser chain having little or no effect when incorporated in the suspension of solids in the oil-displacing surfactant solution.

The invention comprises incorporating one of the long chain dispersing-type surfactants in an aqueous solution of oil-displacing surfactant containing a suspension of minute solid carriers for the surfactant and injecting a slug of the resulting aqueous suspension into an oil stratum in advance of an aqueous driving fluid such as steam and/or water. The solids are of a size in the range of 0.001 to 1 micron and the quantity is in the range of 0.05 to 2 weight percent of the solution. When utilizing dead cells, the concentration thereof is in the range of 0.01 to 0.5 weight percent and preferably 0.08 to 0.15 weight percent. The concentration of oil-displacing surfactant is in the range of 0.001 to 2 weight percent and preferably 0.01 to 1 weight percent and a similar concentration of the dispersing surfactant is used. The size of the slug to be injected is in sin the range of 0.05 to 1 pore volume of the stratum area to be swept by the drive.

A broad aspect of the invention comprises incorporating a polysaccharide-type viscosifier and at least one of the long chain dispersing-type surfactants in an aqueous solution of oil-displacing surfactant containing a suspension of minute solid carriers for the surfactant, and injecting a slug of the resulting aqueous suspension into an oil stratum in advance of an aqueous driving fluid such as steam and/or water. Polysaccharide has the following possible structure:

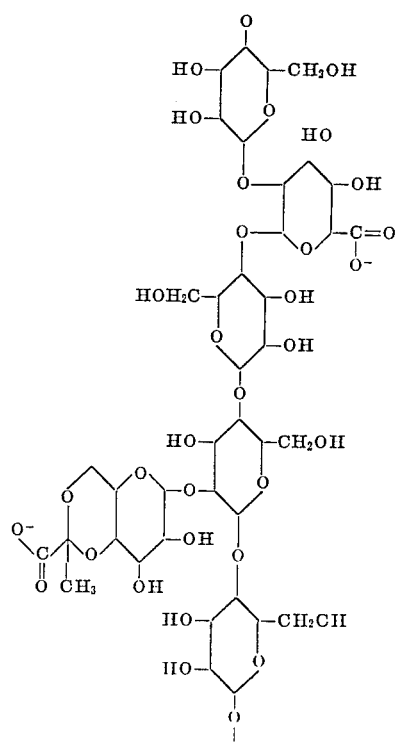

and is available commercially, under the following product designations: Kelzan manufactured by Kelco Company and Biopolymer XB-23 manufactured by General Mills. The size of the slug to be injected is in the range of from about 0.1 to 1.5 pore volume of the stratum area to be swept by the drive. The aqueous fluid drive pushes the slug through the stratum toward at least one offset well, therein displacing oil into said offset well from which it is recovered.

Other viscosifiers within the scope of the invention include phosphomannan Y-2448, a phosphorylated mannan composed of the exocellular polysaccharide resulting from the action of the yeast, *Hansenula holstii*, manufactured by Northern Regional Laboratories and as disclosed in U.S. Pat. No.

3,312,279, galactomannan gums manufactured by General Mills and marketed under the trade name, Gendrive.

It has been surprisingly found that the action of the viscosifier so complements the action of the carbon black-surfactants that a greatly improved result is obtained both in the amount of oil removed and in the decreased amount of the carbon black-surfactant and viscosifier necessary even to achieve this improved result. Although not wishing to be confined by any particular theoretical explanation, the following hypothesis has been proposed to explain the improved operation of the instant invention. It is believed that the carbon black front of a slug of carbon black-surfactant additive injected into a reservoir moves at a lower velocity than the front of the total injected fluid, each carbon black-surfactant flood is then in effect preceded by a water flood. The incorporation in a carbon black-surfactant slug of a viscosifier which does not interact with the reservoir components probably means that this agent would be present in the waterflood immediately preceding the leading edge of the carbon black-surfactant added to the system. In accordance with current concepts of viscosifier action this not only produces additional displacement of oil, but also operates to open up additional aqueous flow channels in the reservoir which would then become available to the action of the carbon black-surfactant additive. Such benefits have been seen to produce not only more oil from increased additive sweep, but also have greatly increased the efficiency of oil reached within the area swept by the carbon black-surfactant additive.

In many applications of the instant invention, it is possible to use a salt solution as the aqueous fluid drive comprising connate water in the stratum. An illustration of this situation is found in the water coning around the production well wherein salt water from a subterranean water table forms a cone around the production well. This type of operation greatly reduces costs in supply of relatively pure water by being able to use the readily available connate water found occurring naturally around the production well.

In a preferred embodiment of the instant invention, the solids as described above are of a size in the range of 0.001 to 1 micron and the quantity is in the range of 0.05 to 2 weight percent of the solution. When utilizing dead cells, the concentration thereof is in the range 0.01 to 0.5 weight percent and preferably 0.08 to 0.15 weight percent. The concentration of oil-displacing surfactants is in the range of 0.04 to 0.4 weight percent, preferably 0.2 to 0.3 weight percent, and a similar concentration of the dispersing surfactant is used. The concentration of the invention viscosifier is in the range from about 0.1 to about 0.5 weight percent.

In actual operation, this invention comprises incorporating one of the long chain dispersing-type surfactants in an aqueous solution of oil-displacing surfactant containing a suspension of minute solid carriers for the surfactant, and a suitable polysaccharide viscosifier, as described above, and injecting a slug of the resulting aqueous suspension into an oil stratum in advance of an aqueous driving fluid such as steam and/or water. The size of the slug to be injected is in the range of from about 0.1 to 1.5 pore volume of the stratum area to be swept by the drive. The aqueous fluid drive pushes the slug through the stratum toward at least one offset well therein displacing oil into said offset well from which is is recovered.

EXAMPLE

In the following tests, Igepal CO-990 was used as the dispersing nonoil-displacing surfactant and Philblack I (trademark of Phillips Petroleum Company), a furnace black, was used as particulate solid surfactant carrier as illustrative of other solid carrier materials. Igepal CO-530 was used as the oil-displacing surfactant, and Kelzan was used as the heteropolysaccharide viscosifier.

The reservoir sand used was from an outcrop of Nacatoch sand which is the same as that found in the oil-bearing portion of the Smackover-Nacatoch reservoir. Smackover crude oil was used which had been previously verified as essentially free of water in trapped solids and was used without further treatment. The aqueous phase used in reconstitution, waterflooding and additive preparation was a simulated Smackover field brine containing 40 grams per liter NaCl, 10.5 grams per liter $CaCl_2$, and 4.8 grams per liter of $MgCl_2 \cdot 6H_2O$.

Tests were carried out at reservoir temperature in 6-foot long, ¾-inch ID, schedule 80 iron pipes. Reservoir temperature was maintained by an 8-foot heating tape wrapped directly around the pipe and insulated by several layers of asbestos tape. Simulated reservoir temperature of about 115° F. was maintained.

The displacement tubes were reconstituted by first evacuating with a vacuum pump, and oil was then introduced during which the pore volume of the sand pack was measured. The tube was then flooded with a simulated Smackover brine and a constant injection rate of 1.0 ml. per minute was maintained until a water-oil ratio of 100 was reached. Additive injection was begun immediately after the waterflood at the same rate. Individual production samples were collected in 50 ml. centrifuge tubes on an automatic collector. The method of additive preparation was identical in each case; appropriate amounts of the two surfactants were added from previously prepared 1 percent solutions in simulated reservoir brine, the mixture was diluted to the correct concentration with additional brine and carbon black was added dry in the "smoke" or loose condition. The proper amount of viscosifier was then added and the mixture was then stirred for 15 minutes at a high speed on an Osterizer and used within 48 hours of its preparation.

The following table shows the results of ten experiments. A comparison of runs 1 and 2 with runs 4 and 6 shows that there is a decrease in the amount of residual oil remaining in the sand after the additive flood of the instant invention. These runs also show that less total additive and less additive at breakthrough is necessary to achieve a greater removal and hence less residual oil than was found in each case for either runs using Igepal CO-990 and CO-530 on carbon black and with Kelzan alone. Comparison of runs 1 and 2 with runs 8, 9 and 10 indicates the synergistic effect between the combination of surfactants on the carbon black carrier. Run 7 indicates that the concentration of Kelzan below about 0.1 percent is not effective in improving the oil-removing characteristics of the carbon black-surfactants. Comparisons of runs 1 and 2 with runs 3 and 5 and with runs 4 and 6 indicate the synergistic effect of the combination of Kelzan with the surfactants and carbon black carrier.

TABLE

| Run No. | 1 | 2 | 3 | 4 | 5 | 6 | 7 | 8 | 9 | 10 |
|---|---|---|---|---|---|---|---|---|---|---|
| Components, wt. percent in brine: | | | | | | | | | | |
| Igepal CO-990 | 0.24 | 0.24 | 0 | 0.24 | 0 | 0.24 | 0.24 | 0.24 | 0.24 | 0.36 |
| Igepal CO-530 | 0.24 | 0.24 | 0 | 0.24 | 0 | 0.24 | 0.24 | 0.24 | 0 | 0 |
| Philblack I | 0.40 | 0.40 | 0 | 0.40 | 0 | 0.40 | 0.40 | 0.40 | 0.40 | 0 |
| Kelzan | 0 | 0 | 0.50 | 0.50 | 0.25 | 0.25 | 0.40 | 0 | 0.40 | 0 |
| Residual oil, percent of pore volume | 28.2 | 29.0 | 11.1 | 8.7 | 27.5 | 14.4 | 0.10 | 0 | 0 | 0 |
| Incremental oil removal, percent of pre volume | 18.0 | 16.5 | 38.0 | 36.6 | 29.4 | 35.4 | 34.6 | 27.5 | 32.3 | 35.0 |
| Additive at breakthrough, PV | 1.37 | 1.39 | 0.94 | 0.79 | 0.67 | 0.74 | 18.7 | 6.0 | 7.7 | 5.0 |
| Total additive, PV | 1.97 | 2.11 | 1.46 | 1.75 | 1.91 | 1.91 | 1.37 | 8.23 | 3.14 | 1.36 |
| | | | | | | | 2.40 | | | 2.80 |

I claim:

1. In a process for producing oil from an oil stratum comprising injecting a slug of an aqueous solution of surfactant having oil-displacing properties, containing suspended minute solids which are moved through said stratum by a following driving fluid to aid in the displacement of oil, thereafter injecting an aqueous driving fluid so as to move said surfactant and solids through said stratum toward at least one offset well and displace oil thereinto, and recovering the displaced oil, the improvement comprising incorporating in said solution a polysaccharide viscosifying agent in a concentration in the range of 0.1 to about 0.5 weight percent.

2. The process of claim 1 wherein the solids are carbon black and the surfactants are dissolved in water before introducing said solids to the solution.

3. The process of claim 1 wherein the solids are carbon black particles and wherein said aqueous solution also contains a dispersing surfactant.

4. A process according to claim 1 wherein therein is injected in said stratum through a well therein from 0.05 to 1 pore volume of an aqueous slug comprising:
   a. a suspension of minute solids of a size in the range of 0.001 to 1 micron capable of being driven through said stratum by aqueous fluid drive to assist in displacing oil therefrom;
   b. an oil-displacing surfactant having the formula R—R'—R''—H wherein R is an aliphatic alkyl of nine to 20 carbon atoms or an alkylaryl of which the alkyl has eight to 20 carbon atoms and the aryl is attached to R', R' is O or S, and R'' is polyethylene oxide of an average of four to 11 units, in solution in a concentration in the range of 0.001 to 2 weight percent; and
   c. a dispersing surfactant having the formula R—O—R'—H wherein R is an aliphatic alkyl of five to 20 carbon atoms or an alkylaryl, the alkyl having eight to 20 carbon atoms and the aryl is attached to the O, and R' is a polyethylene oxide of an average of 30 to 100 units, in solution in a concentration in the range of 0.001 to 2 weight percent.

5. The process of claim 4 wherein said solids of (a) are carbon black particles.

6. The process of claim 4 wherein the surfactant of (b) is nonylphenoxypolyethanol having an average chain length on the hydrophilic end in the range of 6 to 6.5 moles or units of ethylene oxide and is present in a concentration of 0.1 to 1 weight percent.

7. The process of claim 4 wherein the surfactant of (c) is a nonylphenoxypolyethanol having an average chain length on the hydrophilic end in the range of 95 to 100 moles or units of ethylene oxide and is present in a concentration of 0.1 0.1 1 weight percent.

8. The process of claim 4 wherein the solids of (a) are carbon black, the surfactant of (b) is nonylphenoxypolyethanol having an average chain length on the hydrophilic end in the range of 6 to 6.5 moles or units of ethylene oxide and is present in a concentration of 0.1 to 1 weight percent, and the surfactant of (c) is a nonylphenoxypolyethanol having an average chain length on the hydrophilic end in the range of 95 to 100 moles or units of ethylene oxide and is present in a concentration of 0.1 to 1 weight percent.

9. A waterflooding medium comprising an aqueous liquid; and a mixture of additives including: a. a suspension of minute solids of a size in the range of 0.001 to 1 micron;
   b. an oil-displacing surfactant having the formula R—R'—R''—H wherein R is an aliphatic alkyl of nine to 20 carbon atoms or an alkylaryl of which the alkyl is eight to 20 carbon atoms and the aryl is attached to R', R' is O or S, and R'' is polyethylene oxide of an average of four to 11 units, in solution in a concentration in the range of 0.001 to 2 weight percent;
   c. a dispersing surfactant having the formula R—O—R'—H wherein R is an aliphatic alkyl of five to 20 carbon atoms or an alkylaryl, the alkyl having eight to 20 carbon atoms and the aryl is attached to the O, and R' is the polyethylene oxide of an average of 30 to 100 units, in solution in a concentration in the range of 0.001 to 2 weight percent; and
   d. a polysaccharide viscosifying agent in solution in a concentration in the range of 0.1 to 0.5 weight percent.

10. The composition of claim 9 wherein (a) is carbon black, (b) is nonylphenoxypolyethanol having an average chain length on the hydrophilic end in the range of 6 to 6.5 moles or units of ethylene oxide, and (c) is a nonylphenoxypolyethanol having an average chain length on the hydrophilic end in the range of 95 to 100 moles or units of ethylene oxide, and wherein the concentration of (b) and (c) is in the range 0.1 to 1 weight percent.

* * * * *